United States Patent
Tarozzi

(10) Patent No.: US 12,168,365 B2
(45) Date of Patent: Dec. 17, 2024

(54) PROCESS AND SYSTEM FOR THE PRODUCTION OF SLABS MADE OF MINERAL GRITS BOUND WITH RESINS

(71) Applicant: SITI—B&T GROUP S.p.A., Formigine (IT)

(72) Inventor: Fabio Tarozzi, Formigine (IT)

(73) Assignee: SITI—B&T GROUP S.p.A., Formigine (IT)

( * ) Notice: Subject to any disclaimer, the term of this patent is extended or adjusted under 35 U.S.C. 154(b) by 212 days.

(21) Appl. No.: 17/762,053

(22) PCT Filed: Sep. 18, 2020

(86) PCT No.: PCT/IB2020/058706
§ 371 (c)(1),
(2) Date: Mar. 19, 2022

(87) PCT Pub. No.: WO2021/053596
PCT Pub. Date: Mar. 25, 2021

(65) Prior Publication Data
US 2022/0388331 A1     Dec. 8, 2022

(30) Foreign Application Priority Data
Sep. 19, 2019   (IT) .......... 102019000016799

(51) Int. Cl.
| | | |
|---|---|---|
| *B44F 9/04* | (2006.01) | |
| *B28B 1/00* | (2006.01) | |
| *B28B 11/00* | (2006.01) | |
| *B44C 5/04* | (2006.01) | |

(52) U.S. Cl.
CPC ............ *B44C 5/0453* (2013.01); *B28B 1/005* (2013.01); *B28B 11/001* (2013.01)

(58) Field of Classification Search
CPC ......... B44C 5/0453; B44C 5/06; B28B 1/005; B28B 11/001; B29C 67/24; B29C 67/244; B44F 9/04
USPC ........................................................ 264/129
See application file for complete search history.

(56) References Cited

U.S. PATENT DOCUMENTS

| | | | |
|---|---|---|---|
| 11,433,576 B2 * | 9/2022 | Bianchini | B29C 43/56 |
| 2019/0099915 A1 | 4/2019 | Adams et al. | |
| 2022/0410427 A1 * | 12/2022 | Tarozzi | B28B 11/001 |

FOREIGN PATENT DOCUMENTS

| | | | |
|---|---|---|---|
| EP | 0 909 241 A1 | 4/1999 | |
| WO | WO 98/00297 A1 | 1/1998 | |

* cited by examiner

*Primary Examiner* — Hannah J Pak
(74) *Attorney, Agent, or Firm* — ASLAN LAW, P.C.

(57) ABSTRACT

A process for the production of slabs made of mineral grits bound with resins comprises at least the phases of supplying a basic mixture that includes mineral grits and resins; loading the basic mixture inside at least one forming mold so as to obtain a laying surface facing downwards and an exposed surface facing upwards; compacting the basic mixture inside the forming mold to obtain a compacted slab; and hardening the compacted slab to obtain a slab made of mineral grits, wherein, after the compacting, a decoration phase with ink by digital printing of said exposed surface of said compacted slab is provided.

13 Claims, 5 Drawing Sheets

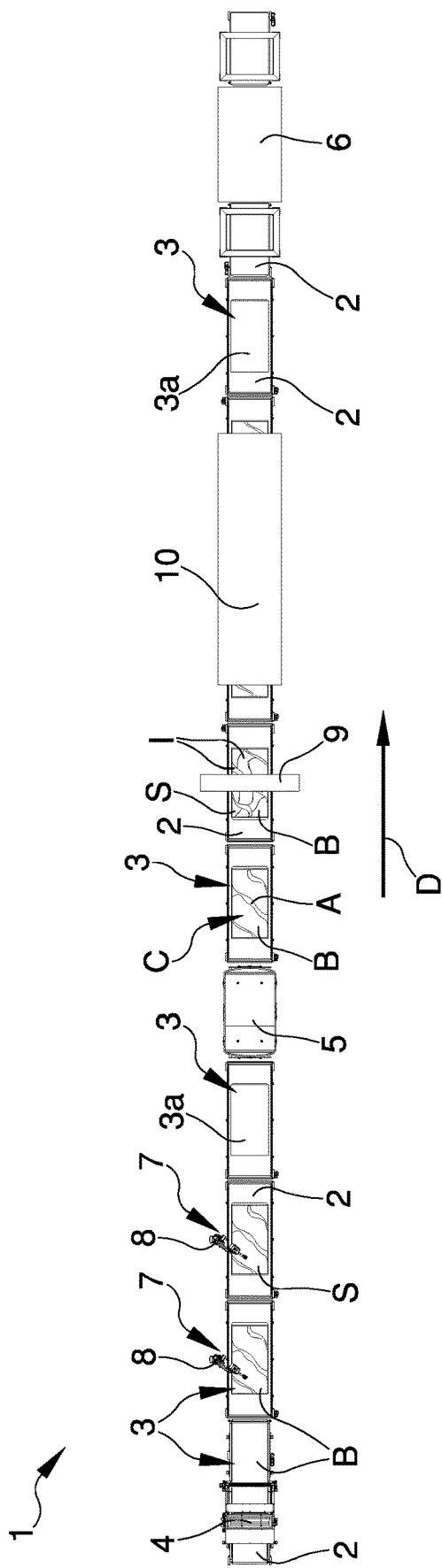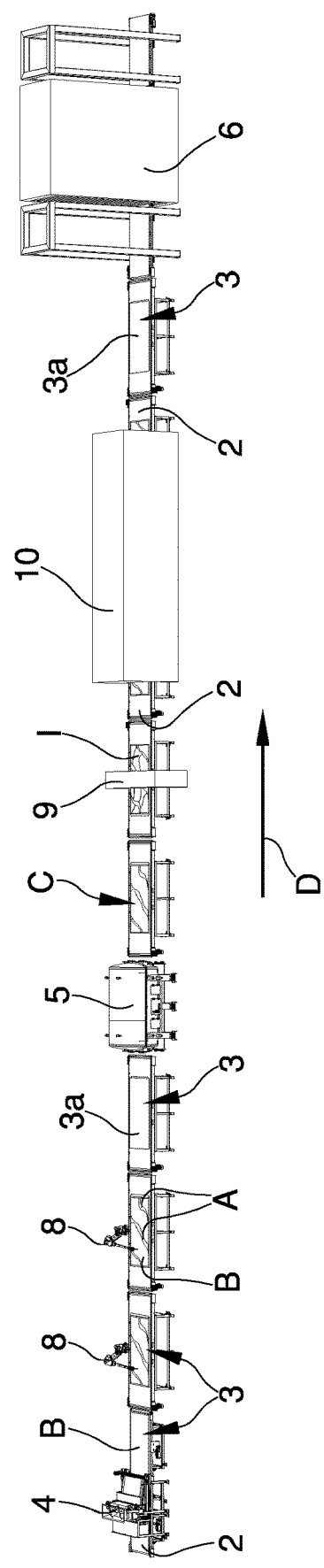

PROCESS AND SYSTEM FOR THE PRODUCTION OF SLABS MADE OF MINERAL GRITS BOUND WITH RESINS

CROSS-REFERENCE TO RELATED APPLICATIONS

This application claims priority to IT patent application Ser. No. 10/201,9000016799 filed on Sep. 19, 2019, and this application claims priority to and is a 371 of international PCT Application No. PCT/IB2020/058706 filed on Sep. 18, 2020, the entire contents of which are hereby incorporated by reference.

TECHNICAL FIELD

The present invention relates to a process and a system for the production of slabs made of mineral grits bound with resins.

BACKGROUND ART

In some production sectors, such as e.g. the building and furnishing industry, but not only, slabs made of mineral grits bound with resins are now widely used.

As far as the aesthetic and functional characteristics are concerned, these slabs are completely comparable to the slabs directly obtained from natural materials such as marble, granite, or the like.

Compared to the latter, however, the slabs made of mineral grits bound with resins do also have further important advantages.

First of all, they can be made in several variants distinguished by colors and/or designs and/or aesthetic effects that cannot be obtained using the natural materials mentioned above: in other words, therefore, their production is more versatile and customizable to meet customers' requirements.

Another advantage is that, since the material obtained is less porous, e.g., than marble, it is substantially unassailable by the most commonly used liquids; moreover, it is also more resistant to stains.

For these reasons, these slabs are widely used, e.g., in the construction of tops for kitchens, bathrooms and other similar applications.

The above mentioned slabs are produced starting from a mixture generally comprising minerals in granular form (e.g. marble, granite, glass, mirror fragments, and/or others) as well as quartz powder and resins that act as binders. After being prepared, this mixture is deposited inside a mold, in which the forming cavity has the dimensions of the object to be obtained (unless any shrinkage that may occur in the subsequent production phases).

The mixture is then decorated in order to create special aesthetic effects present in natural rocks.

For example, decorations are made in a passing through material to obtain the so-called "veins", i.e. streaks of different color compared to the basic material, having an irregular pattern and crossing the entire thickness thereof.

The mold is then introduced into a compacting appliance in which the mixture is pressed into the cavity, and simultaneously subjected to a vibrating action, so as to obtain a compacted slab.

In addition thereto, it is expected that the compaction of the slabs will take place in a depressurized environment, i.e. at a lower pressure than atmospheric pressure: in fact, the elimination of air from the forming area further facilitates the compaction of the materials in the mixture.

Afterwards, the compacted slab undergoes a final hardening phase in order to give it the desired mechanical strength.

The processes and systems of known type do however have some drawbacks mainly related to the difficulty of obtaining slabs made of mineral grits provided with valuable decorative effects that remain unchanged for the entire processing cycle.

In fact, after pressing, the slabs do have an irregular surface and need to be smoothed.

This operation involves the removal of material which, although partial, can lead to the alteration of the surface decorations applied to the slab in the previous phases, thus affecting the entire work.

In the processes of known type, the difficulty has also been ascertained to reproduce the surface appearance of natural rocks or to vary the surface finish of the slabs to obtain the desired aesthetic effect.

DESCRIPTION OF THE INVENTION

The main aim of the present invention is to devise a process and a system for the production of slabs made of mineral grits bound with resins that allow making in a simple and reliable manner slabs made of mineral grits with decorative effects that remain unaltered during the whole work and after the finishing operations.

A further object of the present invention is to devise a process and a system for the production of slabs made of mineral grits bound with resins that allow obtaining in a simple and reliable manner a wide variety of aesthetic effects. Another object of the present invention is to devise a process and a system for the production of slabs made of mineral grits bound with resins that allow overcoming the aforementioned drawbacks of the prior art in a simple, rational, easy, effective to use and low-cost solution.

The aforementioned objects are achieved by the present process for the production of slabs made of mineral grits bound with resins having the characteristics of claim 1.

The aforementioned objects are achieved by the present system for the production of slabs made of mineral grits bound with resins having the characteristics of the claimed invention.

BRIEF DESCRIPTION OF THE DRAWINGS

Other characteristics and advantages of the present invention will be more evident from the description of a preferred, but not exclusive, embodiment of a process and a system for the production of slabs made of mineral grits bound with resins, illustrated by way of an indicative, yet non-limiting example, in the attached tables of drawings in which:

FIG. 1 is a top view of a system for the production of slabs made of mineral grits bound with resins according to the invention;

FIG. 2 is a perspective view of the system for the production of slabs made of mineral grits bound with resins according to the invention;

EMBODIMENTS OF THE INVENTION

Figure 3:
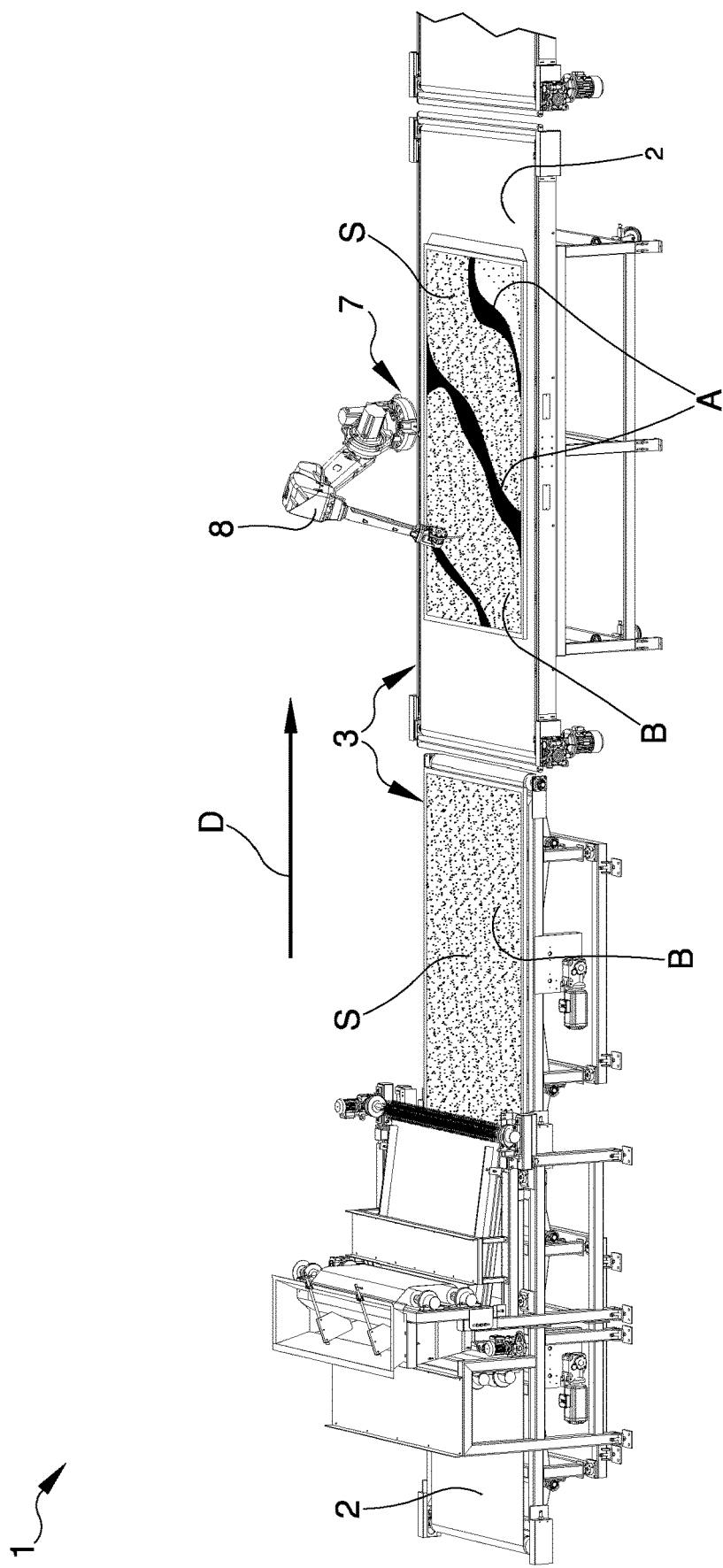
FIGS. 3-6 are perspective views of the system for the production of slabs made of mineral grits bound with resins in the execution of the process according to the invention.

With particular reference to these figures, reference numeral 1 globally indicates a system for the production of slabs made of mineral grits bound with resins. The system 1 comprises:

at least one supporting surface 2;
at least one forming mold 3 adapted to be positioned resting on the supporting surface 2;
loading means 4 of at least one basic mixture B comprising mineral grits and resins inside the forming mold 3;
compacting means 5 of the basic mixture B to obtain a compacted slab C;
hardening means 6 of the compacted slab C to obtain a slab made of mineral grits.

Within the scope of the present discussion, by mineral grits and resins are meant minerals in granular form, e.g. marble, granite, glass, mirror fragments, and/or others, as well as quartz powder, while resins may be, e.g., of the thermosetting type, especially for construction and furnishing applications.

After it has been prepared, the basic mixture B is deposited inside the forming mold 3, on the supporting surface 2, to undergo further operations.

Preferably, the supporting surface 2 is movable along a direction of forward movement D and is composed, e.g. of a conveyor belt, a roller conveyor, or the like.

The forming mold 3 is open at the top and defines a cavity adapted to contain the basic mixture B.

In particular, the cavity has substantially the size of the slab to be obtained, unless any shrinkage that may occur in subsequent production phases.

The forming mold 3 can be made of either a rigid or a flexible material.

The loading means 4 are of the type of a hopper, which, as a result of the movement of the supporting surface 2 along the direction of forward movement, deposits the basic mixture B into the forming mold 3 in order to obtain a laying surface facing downwards and an exposed surface S facing upwards.

The laying surface is intended, in use, to be applied on the surface to be coated, while the exposed surface S is intended, in use, to be visible.

In an alternative embodiment, the supporting surface 2 can be of the fixed type and the loading means 4 movable with respect thereto along the direction of forward movement D.

In the embodiment shown in the figures, the system 1 also comprises application means 7 of at least one additional mixture A of mineral grits and resins to the basic mixture B.

In more detail, the additional mixture A differs from the basic mixture B by at least one of grain size, color and composition of the mineral grits.

The application of the additional mixture A is intended to create veins within the basic mixture B, i.e. streaks of a different color from the basic mixture B.

In particular, the application is carried out on the exposed surface S of the basic mixture B.

Alternatively or in combination therewith, the application can also be carried out in a full-body manner, in order to create veins of the "pass-through" type, i.e. that extend by the entire thickness of the basic mixture B.

Preferably, the application means 7 comprise at least one dispensing device 8, of the type of an anthropomorphic mechanical arm, adapted to dispense the additional mixture A according to a predetermined trajectory.

The application means 7 may also comprise one of either a suction device or a displacement device of the basic mixture B arranged upstream of the dispensing device 8 and which can also be moved along the same predetermined trajectory in order to define a groove inside which the additional mixture A is then dispensed.

In the embodiment shown in the figures, the application means 7 comprise a plurality of dispensing devices 8 arranged in succession along the direction of forward movement D and each adapted to dispense a respective additional mixture A to the basic mixture B.

The presence of a plurality of dispensing devices 8 allows obtaining a plurality of different decorative effects on the same slab.

As shown in the figures, the application means 7 are arranged between the loading means 4 and the compacting means 5.

The compacting means 5 are of the known type and, in particular, they allow carrying out the compaction through vacuum vibro-compression.

Through this operation, the mixtures B and A are pressed inside the cavity, and simultaneously subjected to a vibrating action, which facilitates the adhesion of the grits making up the mixtures themselves.

At the same time, a suction operation is carried out in order to create a depressurized environment so as to eliminate the air present in the gaps between the mineral grits and to optimize compaction still further.

In order to avoid direct contact of the materials with the compacting means, the forming mold 3 also comprises a covering plate 3a adapted to close the aforementioned cavity and which is positioned on the mixtures B and A before compaction.

Afterwards, the compacted slab C is transferred to the aforementioned hardening means 6.

The hardening means 6 comprise a heated chamber inside which the catalysis takes place of the resins present in the mixtures B and A in order to obtain the slab provided with the desired mechanical and physical properties.

The system 1 may also comprise finishing means, not shown in the figures, adapted to finish the slab superficially and arranged downstream of the hardening means 6.

Specifically, the finishing means are adapted to make at least one smoothing operation of the exposed surface S of the slab.

According to the invention, the system 1 comprises decoration means 9 by means of digital printing, which are arranged downstream of the compacting means 5 with respect to the direction of forward movement D, adapted to dispense at least one ink I on the exposed surface S of the compacted slab C.

In particular, the decoration means 9 are positioned between the compacting means 5 and the hardening means 6.

The decoration means 9 have the function of finishing the decorations carried out through the application means 7, following the same predetermined trajectory traced by the dispensing devices 8 and/or of adding new ones according to a different predefined design, before subjecting the compacted slab C to the hardening phase.

The decoration means 9 are of the type of a digital ink printer, which comprises a plurality of moving heads, adapted to dispense ink I following a predefined design.

The decoration means 9 may therefore dispense ink I above the additional mixture A by coating it and/or according to a different design.

In particular, the ink I is of the penetrating type and can penetrate the exposed surface S of the compacted slab C up to a depth of 3 to 4 cm.

Conveniently, the system 1 comprises preheating means 10 adapted to preheat the compacted slab C, positioned between the decoration means 9 and the hardening means 6.

The preheating means 10 have the function of promoting the penetration of the ink I inside the compacted slab C to reach the desired depth, so that the aesthetic effect thus obtained is visible even after the exposed surface S has been smoothed.

The operation of the system 1 in the execution of the process according to the invention is as follows.

The process to which the present invention relates involves first of all the supply of the basic mixture B and of the forming mold 3.

As shown in FIG. 3, the basic mixture B is loaded inside the forming mold 3 so as to obtain a laying surface facing downwards and an exposed surface S facing upwards.

This phase is carried out by the loading means 4.

Advantageously, after the basic mixture B has been loaded into the forming mold 3, one application phase is carried out of at least one additional mixture A of mineral grits and resins to the basic mixture B.

In the embodiment of the aforementioned system 1, the forming mold 3 and, then, the basic mixture B contained therein, is moved along the direction of forward movement D by means of the supporting surface 2 until it reaches the application means 7 of the additional mixture A to the basic mixture B. (FIG. 3)

The application of the additional mixture A to the basic mixture B is conveniently carried out according to at least one predetermined trajectory.

At this point, the process comprises the compaction of the basic mixture B and of the at least one additional mixture A contained inside the forming mold 3 to obtain the compacted slab C.

Figure 4:
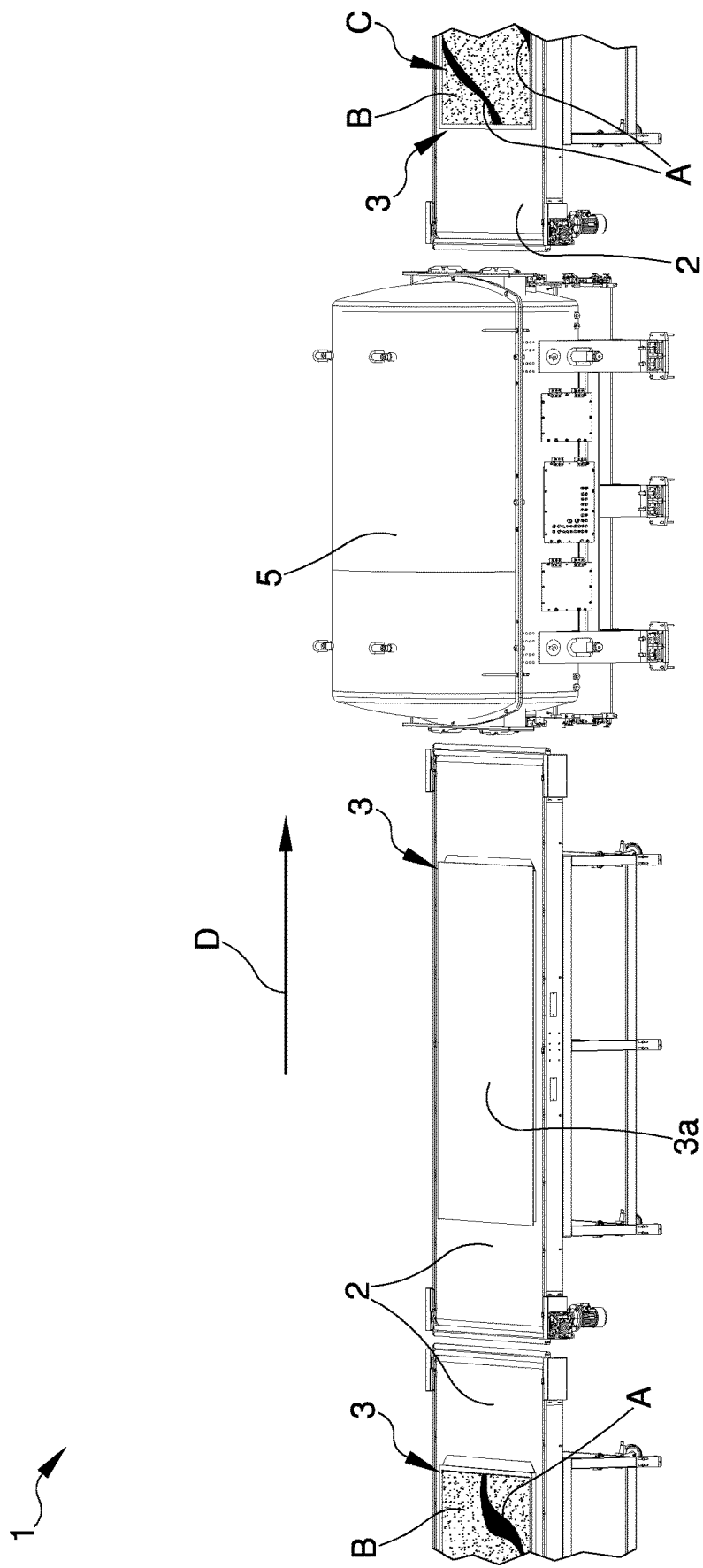

The compaction phase is carried out by means of the compacting means 5. Conveniently, after the application of the additional mixture A and prior to compaction, the process appropriately involves a first closure of the forming mold 3 through the covering plate 3a. (FIG. 4)

Figure 5:
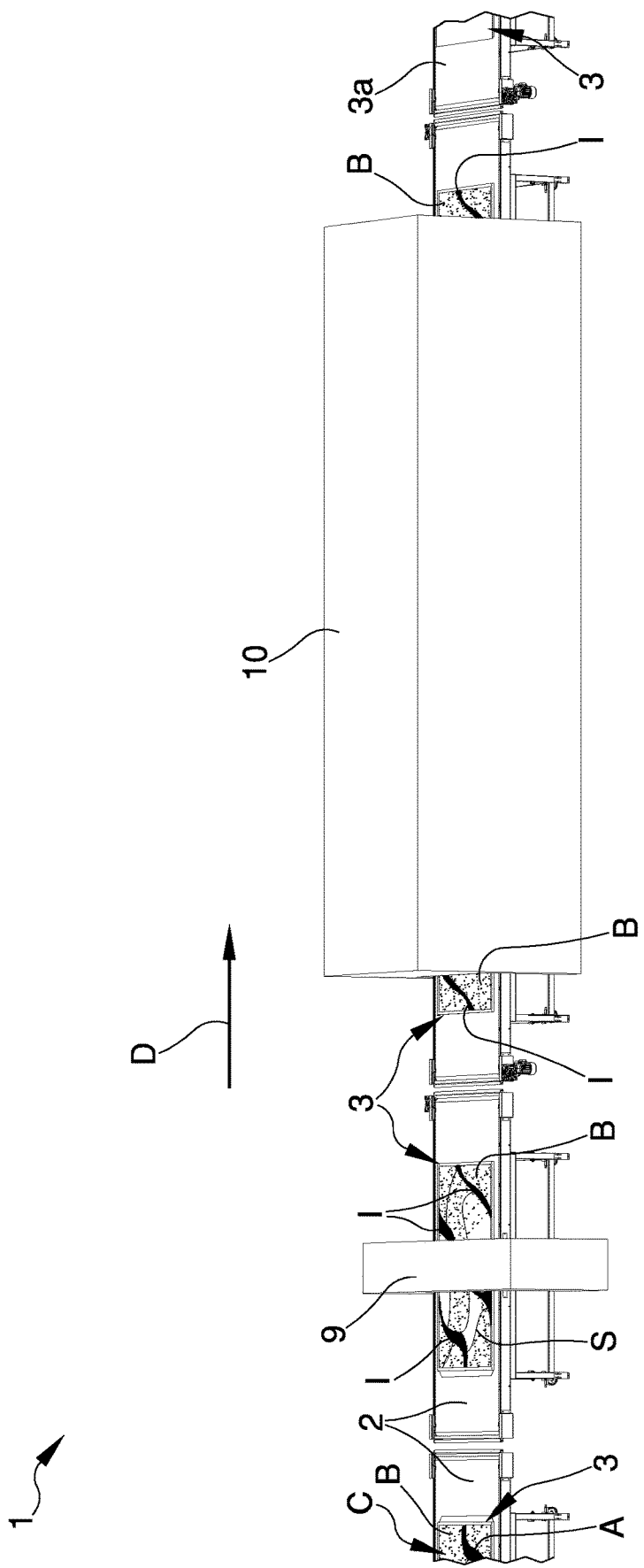

According to the invention, after compaction, the process comprises a decoration phase with ink I by means of digital printing of the exposed surface S of the compacted slab C, as shown in FIG. 5.

This phase is carried out by means of the decoration means 9.

The decoration is advantageously carried out following the predetermined trajectory to dispense the ink I at the point where the additional mixture A is located.

The decoration can also be done by dispensing the ink I according to the predefined design.

Conveniently, between compaction and decoration, the forming mold 3 is opened by removing the covering plate 3a, to free the exposed surface S.

The decoration of the compacted slab C by digital printing is then carried out on the basic mixture B and possibly also on the additional mixture A, still "wet", i.e. before being subjected to a firing phase.

After decoration, a phase of at least partial infiltration of the ink I into the compacted slab C is carried out to allow the ink I to penetrate its thickness. The infiltration is usefully carried out by preheating the compacted slab C through the preheating means 10. (FIG. 5)

This heating is preferably carried out at a temperature between 30° C. and 60° C. Advantageously, preheating is carried out with the forming mold 3 open at the top.

This facilitates the heating of the exposed surface S and the infiltration of ink I into the compacted slab C.

Figure 6:
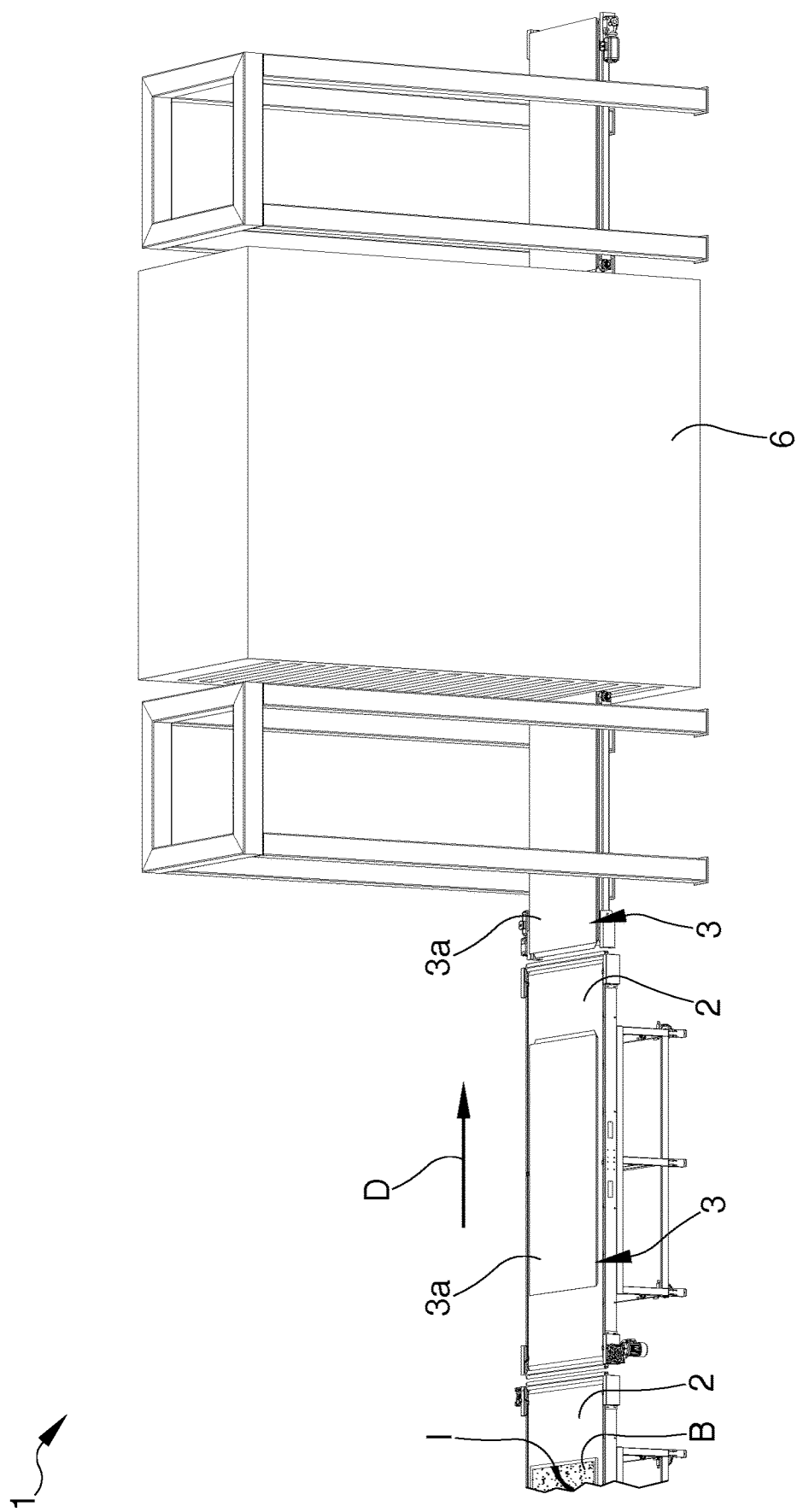

Finally, the hardening phase of the compacted slab C is carried out to obtain the slab, using the hardening means. (FIG. 6)

More specifically, the hardening phase is carried out by heating the compacted slab C.

This heating is carried out at a temperature comprised between 100° C. and 150° C.

Between the preheating phase and the hardening phase, a second closure of the forming mold 3 is carried out using the covering plate 3a.

Preferably, after the hardening phase, the slab is removed from the forming mold 3 and the slab itself is smoothed.

The smoothing operation is carried out by partial removal of material from the slab and allows obtaining a smoother and more regular exposed surface S.

The particular device of having a decoration with penetrating ink I ensures that the smoothing phase, as a result of the removal of material, does not alter the decorative effects given to the slab during the previous working phases.

It has in practice been ascertained that the described invention achieves the intended objects and in particular the fact is underlined that the process and the system according to the invention allow obtaining slabs made of mineral grits provided with a wide variety of aesthetic effects.

This is possible thanks to the decoration by digital printing of the compacted slab when it is still wet. The use of digital printing also makes it possible to exactly reproduce the design created by means of the application of the additional mixture, when present, before compaction.

The process and the system according to the invention allow making in a simple and reliable manner slabs made of mineral grits with decorative effects that remain unchanged during the whole work and after the finishing operations.

The invention claimed is:

1. A process for the production of slabs made of mineral grits bound with resins comprising the phases of:
supplying a basic mixture comprising mineral grits and resins;
loading said basic mixture inside at least one forming mold so as to obtain a laying surface facing downwards and an exposed surface facing upwards;
compacting said basic mixture inside said forming mold to obtain a compacted slab; and
hardening said compacted slab to obtain a slab made of mineral grits, wherein
after said compaction, a decoration phase with ink by means of digital printing of said exposed surface of said compacted slab, wherein
said forming mold is open at the top and said process further comprising a first phase of closure of said forming mold prior to said compaction.

2. The process according to claim 1, wherein after said decoration, a phase of at least partial infiltration of said ink into said compacted slab.

3. The process according to claim 2, wherein said infiltration is carried out by heating said compacted slab.

4. The process according to claim 1, wherein said ink is of the penetrating type.

5. The process according to claim 1, wherein prior to said compaction, a phase of application of at least one additional mixture of mineral grits and resins to said basic mixture.

6. The process according to claim 5, wherein said application is carried out on the exposed surface of said basic mixture.

7. The process according to claim 6, wherein said application is carried out in a full-body manner.

8. The process according to claim 5, wherein said application is carried out according to at least one trajectory.

9. The process according to claim 8, wherein said decoration is carried out following said trajectory to dispense said ink at the point where said additional mixture is located.

10. The process according to claim 1, wherein said compaction is carried out through vacuum vibro-compression.

11. A process for the production of slabs made of mineral grits bound with resins comprising the phases of;
- supplying a basic mixture comprising mineral grits and resins;
- loading said basic mixture inside at least one forming mold so as to obtain a laying surface facing downwards and an exposed surface facing upwards;
- compacting said basic mixture inside said forming mold to obtain a compacted slab; and
- hardening said compacted slab to obtain a slab made of mineral grits, wherein
- after said compaction, a decoration phase with ink by means of digital printing of said exposed surface of said compacted slab, and
- a phase of opening of said forming mold between said compaction and said decoration.

12. The process according to claim 11, wherein heating is carried out with said forming mold open at the top.

13. The process according to claim 11, further comprising: a second phase of closure of said forming mold between said heating and said hardening.

\* \* \* \* \*